(12) United States Patent
Zhang et al.

(10) Patent No.: US 12,296,848 B2
(45) Date of Patent: May 13, 2025

(54) ENVIRONMENT-AWARE PATH PLANNING FOR A SELF-DRIVING VEHICLE USING DYNAMIC STEP-SIZE SEARCH

(71) Applicant: VOLVO CAR CORPORATION, Gothenburg (SE)

(72) Inventors: Xinkai Zhang, Sunnyvale, CA (US); Sihao Ding, Sunnyvale, CA (US)

(73) Assignee: VOLVO CAR CORPORATION, Gothenburg (SE)

( * ) Notice: Subject to any disclaimer, the term of this patent is extended or adjusted under 35 U.S.C. 154(b) by 89 days.

(21) Appl. No.: 17/512,198

(22) Filed: Oct. 27, 2021

(65) Prior Publication Data

US 2023/0131553 A1    Apr. 27, 2023

(51) Int. Cl.
*B60W 60/00*    (2020.01)
*B60W 30/06*    (2006.01)
*B60W 30/18*    (2012.01)
*B60W 50/14*    (2020.01)
*G01C 21/00*    (2006.01)

(52) U.S. Cl.
CPC ........ *B60W 60/0011* (2020.02); *B60W 50/14* (2013.01); *G01C 21/3807* (2020.08); *B60W 30/06* (2013.01); *B60W 30/18036* (2013.01); *B60W 2420/403* (2013.01); *B60W 2420/408* (2024.01); *B60W 2420/54* (2013.01); *B60W 2554/406* (2020.02); *B60W 2554/801* (2020.02); *B60W 2554/802* (2020.02); *B60W 2556/45* (2020.02)

(58) Field of Classification Search
CPC ............. B60W 60/0011; B60W 50/14; B60W 2556/45; B60W 2554/406; B60W 30/06; G01C 21/3807
See application file for complete search history.

(56) References Cited

U.S. PATENT DOCUMENTS 8,392,117 B2 * 3/2013 Dolgov ................ G05D 1/0274
701/533
2009/0105939 A1    4/2009 Dolgov et al.
(Continued)

OTHER PUBLICATIONS

González, D., Pérez, J., Milanés, V., and Nashashibi, F.,"A review of motion planning techniques for automated vehicles", IEEE Transactions on Intelligent Transportation Systems, 17(4), 2015, 1135-1145.
(Continued)

*Primary Examiner* — Jelani A Smith
*Assistant Examiner* — Toya Pettiegrew
(74) *Attorney, Agent, or Firm* — Raj S. Davé; Davé Law Group, LLC (57) ABSTRACT

A system and method of planning a path for an autonomous vehicle from the vehicle's initial configuration to the goal configuration which is collision-free, kinematically-feasible, and near-minimal in length. The vehicle is equipped with a plurality of perception sensors such as lidar, camera, etc., and is configured to operate in an autonomous mode. An onboard computing device is configured to process the sensor data and provide a dynamic occupancy grid map of the surrounding environment in real-time. Based on the occupancy grid map, the path planner can quickly calculate a collision-free and dynamically feasible path towards the goal configuration for the vehicle to follow.

17 Claims, 6 Drawing Sheets

(56) References Cited

U.S. PATENT DOCUMENTS

| | | | | |
|---|---|---|---|---|
| 2019/0279049 | A1* | 9/2019 | Doria | G06V 20/653 |
| 2020/0257317 | A1* | 8/2020 | Musk | G05D 1/0033 |
| 2020/0379108 | A1* | 12/2020 | Vijayalingam | G06F 18/253 |
| 2021/0004363 | A1* | 1/2021 | Bailly | G06T 17/05 |
| 2021/0020045 | A1* | 1/2021 | Huang | G01C 21/3804 |
| 2022/0153296 | A1* | 5/2022 | Yu | G06V 20/58 |
| 2022/0207883 | A1* | 6/2022 | Watanabe | G06F 18/22 |
| 2022/0396289 | A1* | 12/2022 | Li | G01C 21/3407 |

OTHER PUBLICATIONS

Dolgov, D., Thrun, S., Montemerlo, M., & Diebel, J., "Practical search techniques in path planning for autonomous driving", Ann Arbor, 1001(48105), 2008, 18-80.

Dolgov, D., Thrun, S., Montemerlo, M., & Diebel, J., "Path planning for autonomous vehicles in unknown semi-structured environments", The international journal of robotics research, 29(5), 2010, 485-50.

Lim, J., & Tsiotras, P., "MAMS-A*: Multi-Agent Multi-Scale A*", In 2020 IEEE International Conference on Robotics and Automation (ICRA), May 2020, 5583-5589.

Toda, Y., & Kubota, N., "Path planning using multi-resolution map for a mobile robot", In SICE Annual Conference 2011, 2011, 1276-1281.

Mohammadi, A., Rahimi, M., & Suratgar, A. A., "A new path planning and obstacle avoidance algorithm in dynamic environment", In 2014 22nd iranian conference on electrical engineering (icee), May 2014, 1301-1306.

Bohlin, R., "Path planning in practice; lazy evaluation on a multi-resolution grid", In Proceedings 2001 IEEE/RSJ International Conference on Intelligent Robots and Systems. Expanding the Societal Role of Robotics in the the Next Millennium (Cat. No. 01CH37180)vol. 1, Oct. 2001, 49-54.

Zhang, Z., Wu, D., Gu, J., & Li, F., "A path-planning strategy for unmanned surface vehicles based on an adaptive hybrid dynamic stepsize and target attractive force-RRT algorithm", Journal of Marine Science and Engineering, 7(5), 2019, 132.

* cited by examiner

ENVIRONMENT-AWARE PATH PLANNING FOR A SELF-DRIVING VEHICLE USING DYNAMIC STEP-SIZE SEARCH

FIELD OF THE INVENTION

An embodiment relates generally to autonomous vehicles and, more particularly, to a method and system for automatically detecting an obstacle and path planning for an autonomous vehicle.

BACKGROUND

Path planning is the means by which autonomous vehicles plan ahead their movements and navigate through the environment. The path planning includes a) Building an offline coordinate-based map that will provide a basis for the vehicle's real-world position and its planned trajectory. b) Localizing the vehicle's current position on the map and planning a short-term path through these points. There can be multiple candidate points for the vehicle's next step. The best candidate can be decided based on the positions of the obstacles (e.g., traffic and pedestrians) detected by the vehicle's sensing modules. c) Finding the best heading and acceleration for the vehicle to ensure a safe path possibly also taking comfortability into account (favoring smoother paths with less sudden acceleration).

The currently popular path planning algorithms encounter one or more challenges in the global paths that make it difficult to navigate the vehicle. Some of the challenges include but are not limited to a) Dynamic solution and path updating cannot be carried out simultaneously in real time during driving process; b) Computation speed is slow, and a large amount of computing resources are consumed; c) Real-time obstacle avoidance cannot be performed. As the challenges are not completely resolved using the existing techniques, the planned paths that are provided are not optimal.

Therefore, there is a long-felt need for providing an efficient method and system for planning a path for a self-driving vehicle which is collision-free, kinematically-feasible, and near-minimal in path length.

SUMMARY

Accordingly, the present disclosure describes one or more aspects of an environment-aware path planning for a self-driving vehicle which is collision-free, kinematically-feasible, and near-minimal in path length.

In an aspect, a system is described herein. The system comprising: an autonomous vehicle comprising a plurality of sensors; a computing device comprising a processor; and a memory communicatively coupled to the processor, wherein the memory stores processor-executable instructions comprising a path planning module further comprising a dynamic step-size generator, which, on execution, causes the processor to: receive, at the computing device, sensor data from the plurality of sensors, pertaining to an environment of a current configuration; receive, at the computing device, a goal configuration; process, by the computing device, the sensor data, the current configuration, and the goal configuration to generate an occupancy grid map of the environment; update, at the computing device, within the occupancy grid map, the current configuration and the goal configuration based on the sensor data; generate, by the computing device, a path comprising a sequence of nodes of dynamic step-size; and wherein a successor node is generated at a current node, using the dynamic step-size generator; wherein a plurality of subpaths is generated at the current node to obtain a local path for the autonomous vehicle to reach to the successor node; wherein the local path is selected from a plurality of collision-free, kinematically-feasible candidate subpaths selected from the plurality of subpaths; and wherein length of the local path is least of the plurality of collision-free, kinematically-feasible candidate subpaths.

In one embodiment of the system, the autonomous vehicle is capable of sensing and navigating the environment.

In another embodiment of the system, the autonomous vehicle is in at least one of a driving mode, a reversing mode, and a parking mode.

In yet another embodiment of the system, the plurality of sensors comprises a camera, a location sensor, a radar sensor, a light detection and range sensor, an ultrasonic sensor, and an audio sensor.

In yet another embodiment of the system, the plurality of sensors is configured to operate in an autonomous mode.

In yet another embodiment of the system, the plurality of sensors is configured to sense an obstacle in the environment.

In yet another embodiment of the system, the computing device comprises at least one of an industrial computing device and a cloud computing device.

In yet another embodiment of the system, the processor comprises a microprocessor.

In yet another embodiment of the system, the memory comprises at least one of a read only memory, a random-access memory and combination thereof.

In yet another embodiment of the system, the path planning module comprises a hybrid A-star algorithm.

In yet another embodiment of the system, the sensor data comprises vehicle data, track data and obstacle data.

In yet another embodiment of the system, the current configuration comprises a current position and current orientation information.

In yet another embodiment of the system, the goal configuration comprises a goal position and goal orientation information.

In yet another embodiment of the system, the goal position is received from at least one of a user interface, an external source, and an internal source.

In yet another embodiment of the system, the occupancy grid map is generated in real-time.

In yet another embodiment of the system, the occupancy grid map is generated dynamically.

In yet another embodiment of the system, the path is to be traversed by the autonomous vehicle from the current configuration to the goal configuration.

In yet another embodiment of the system, the successor node is generated before tracking of the local path by the autonomous vehicle.

In yet another embodiment of the system, the plurality of subpaths connects the current configuration to the goal configuration.

In yet another embodiment of the system, the system is further operable to: receive, at the computing device, data pertaining to real-time traffic, of a road map between the current configuration and the goal configuration from a data source; calculate, by the computing device, a first distance between the current configuration and the goal configuration; calculate, by the computing device, a second distance between the current configuration and the obstacle in the environment; estimate, by the computing device, a density of a plurality of the obstacle; and estimate, by the computing device, a searching step-size based on the density of the plurality of the obstacle, the first distance and the second distance.

In yet another embodiment of the system, the searching step-size is used to create the successor node in the occupancy grid map.

In yet another embodiment of the system, the searching step-size is greater in a wide-open area than the searching step-size in a crowded environment.

In yet another embodiment of the system, the sequence of nodes of dynamic step-size connects the current configuration to the goal configuration.

In yet another embodiment of the system, the system is further operable to: calculate, by the computing device, a maneuver for the autonomous vehicle by using a motion control module to track the local path; and control the autonomous vehicle based on the maneuver.

In yet another embodiment of the system, the maneuver comprises an accelerating maneuver, a braking maneuver, a gear shifting maneuver, and a steering angle maneuver.

In yet another embodiment of the system, the motion control module comprises a longitudinal speed control module, a lateral steering control module and a centralized control module.

In yet another embodiment of the system, the longitudinal speed control module is configured to control driving, braking, acceleration, and deceleration.

In yet another embodiment of the system, the lateral steering control module controls a front wheel steering angle.

In yet another embodiment of the system, the centralized control module controls coupling of the longitudinal speed control module and the lateral steering control module.

In an aspect, a method is described herein. The method, comprises: receiving, at a computing device, sensor data from a plurality of sensors of an autonomous vehicle, pertaining to an environment of a current configuration; receiving, at the computing device, a goal configuration; processing, by the computing device, the sensor data, the current configuration, and the goal configuration to generate an occupancy grid map of the environment; updating, at the computing device, within the occupancy grid map, the current configuration and the goal configuration based on the sensor data; generating, by the computing device, a path comprising a sequence of nodes of dynamic step-size; and wherein a successor node is generated at a current node, using a path planning module comprising a dynamic step-size generator; wherein a plurality of subpaths is generated at the current node to obtain a local path for the autonomous vehicle to reach to the successor node; wherein the local path is selected from a plurality of collision-free, kinematically-feasible candidate subpaths selected from the plurality of subpaths; and wherein length of the local path is least of the plurality of collision-free, kinematically-feasible candidate subpaths.

In one embodiment of the method, the autonomous vehicle is capable of sensing and navigating the environment.

In another embodiment of the method, the autonomous vehicle is in at least one of a driving mode, a reversing mode, and a parking mode.

In yet another embodiment of the method, the plurality of sensors comprises a camera, a location sensor, a radar sensor, a light detection and range sensor, an ultrasonic sensor, and an audio sensor.

In yet another embodiment of the method, the plurality of sensors is configured to operate in an autonomous mode.

In yet another embodiment of the method, the plurality of sensors is configured to sense an obstacle in the environment.

In yet another embodiment of the method, the path planning module comprises a hybrid A-star algorithm.

In yet another embodiment of the method, the sensor data comprises vehicle data, track data and obstacle data.

In yet another embodiment of the method, the current configuration comprises a current position and current orientation information.

In yet another embodiment of the method, the goal configuration comprises a goal position and goal orientation information.

In yet another embodiment of the method, the goal position is received from at least one of a user interface, an external source, and an internal source.

In yet another embodiment of the method, the occupancy grid map is generated in real-time.

In yet another embodiment of the method, the occupancy grid map is generated dynamically.

In yet another embodiment of the method, the path is to be traversed by the autonomous vehicle from the current configuration to the goal configuration.

In yet another embodiment of the method, the successor node is generated before tracking of the local path by the autonomous vehicle.

In yet another embodiment of the method, the plurality of subpaths connects the current configuration to the goal configuration.

In yet another embodiment of the method, the method further comprises: receiving, at the computing device, data pertaining to real-time traffic, of a road map between the current configuration and the goal configuration from a data source; calculating, by the computing device, a first distance between the current configuration and the goal configuration; calculating, by the computing device, a second distance between the current configuration and the obstacle in the environment; estimating, by the computing device, a density of a plurality of the obstacle; and estimating, by the computing device, a searching step-size based on the density of the plurality of the obstacle, the first distance, and the second distance.

In yet another embodiment of the method, the searching step-size is used to create the successor node in the occupancy grid map.

In yet another embodiment of the method, the searching step-size is greater in a wide-open area than the searching step-size in a crowded environment.

In yet another embodiment of the method, the sequence of nodes of dynamic step-size connects the current configuration to the goal configuration.

In yet another embodiment of the method, the method further comprises: calculating, by the computing device, a maneuver for the autonomous vehicle by using a motion control module to track the local path; and controlling the autonomous vehicle based on the maneuver.

In yet another embodiment of the method, the maneuver comprises an accelerating maneuver, a braking maneuver, a gear shifting maneuver, and a steering angle maneuver.

In yet another embodiment of the method, the motion control module comprises a longitudinal speed control module, a lateral steering control module and a centralized control module.

In yet another embodiment of the method, the longitudinal speed control module is configured to control driving, braking, acceleration, and deceleration.

In yet another embodiment of the method, the lateral steering control module controls a front wheel steering angle.

In yet another embodiment of the method, the centralized control module controls coupling of the longitudinal speed control module and the lateral steering control module.

In yet another aspect a non-transitory computer readable medium is described herein. The non-transitory computer readable medium including instructions stored thereon that when processed by at least one processor causes a system associated with an autonomous vehicle to perform operations comprising: receiving, at a computing device, sensor data from a plurality of sensors, pertaining to an environment of a current configuration; receiving, at the computing device, a goal configuration; processing, by the computing device, the sensor data, the current configuration, and the goal configuration to generate an occupancy grid map of the environment; updating, at the computing device, within the occupancy grid map, the current configuration and the goal configuration based on the sensor data; generating, by the computing device, a path comprising a sequence of nodes of dynamic step-size; calculating, by the computing device, a maneuver for the autonomous vehicle by using a motion control module to track a local path; controlling the autonomous vehicle based on the maneuver; and wherein a successor node is generated at a current node, using a dynamic step-size generator; wherein a plurality of subpaths is generated at the current node to obtain the local path for the autonomous vehicle to reach to the successor node; wherein the local path is selected from a plurality of collision-free, kinematically-feasible candidate subpaths selected from the plurality of subpaths; and wherein length of the local path is least of the plurality of collision-free, kinematically-feasible candidate subpaths.

BRIEF DESCRIPTION OF THE FIGURES

In the present disclosure, reference is made to the accompanying drawings, which form a part hereof. In the drawings, similar symbols typically identify similar components, unless context dictates otherwise. Various embodiments described in the detailed description, and drawings, are illustrative and not meant to be limiting. Other embodiments may be used, and other changes may be made, without departing from the spirit or scope of the subject matter presented herein. It will be understood that the aspects of the present disclosure, as generally described herein, and illustrated in the figures, can be arranged, substituted, combined, separated, and designed in a wide variety of different configurations, all of which are contemplated herein. The embodiments are illustrated by way of example and not limitation in the figures of the accompanying drawings, in which like references indicate similar elements and in which.

DETAILED DESCRIPTION

Definitions and General Techniques

For simplicity and clarity of illustration, the drawing figures illustrate the general manner of construction, and descriptions and details of well-known features and techniques may be omitted to avoid unnecessarily obscuring the present disclosure. The dimensions of some of the elements in the figures may be exaggerated relative to other elements to help improve understanding of embodiments of the present disclosure. The same reference numeral in different figures denotes the same element.

The terms "first", "second", "third", and the like in the description and in the claims, if any, are used for distinguishing between similar elements and not necessarily for describing a particular sequence or chronological order. It is to be understood that the terms so used are interchangeable under appropriate circumstances such that the embodiments described herein are, for example, capable of operation in sequences other than those illustrated or otherwise described herein. Furthermore, the terms "include", and "have", and any variations thereof, are intended to cover a non-exclusive inclusion, such that a process, method, system, article, device, or apparatus that comprises a list of elements is not necessarily limited to those elements but may include other elements not expressly listed or inherent to such process, method, system, article, device, or apparatus.

No element, act, or instruction used herein should be construed as critical or essential unless explicitly described as such. Also, as used herein, the articles "a" and "an" are intended to include items and may be used interchangeably with "one or more". In addition, it will be appreciated that the various operations, processes, and methods disclosed herein may be embodied in a non-transitory machine-readable medium and/or a system. Accordingly, the specification and drawings are to be regarded in an illustrative rather than a restrictive sense.

As used herein, the term component is intended to be broadly construed as hardware, firmware, and/or a combination of hardware and software.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products i.e., one or more modules of computer program instructions encoded on a computer-readable medium for execution by, or to control the operation of, data processing apparatus. The computer-readable medium may be a machine-readable storage device, a machine-readable storage substrate, a memory device, a composition of matter affecting a machine-readable propagated signal, or a combination of one or more of them. The term "computing system" encompasses all apparatus, devices, and machines for processing data, including by way of example, a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to a suitable receiver apparatus.

The actual specialized control hardware or software code used to implement these systems and/or methods is not limiting of the implementations. Thus, the operation and behavior of the systems and/or methods described herein without reference to specific software code, it being understood that any software and any hardware can be designed to implement the systems and/or methods based on the description herein.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, for example, without limitation, a Field Programmable Gate Array (FPGA), an Application Specific Integrated Circuit (ASIC), Application Specific Standard Products (ASSPs), System-On-a-Chip (SOC) systems, Complex Programmable Logic Devices (CPLDs), etc.

Processors suitable for the execution of a computer program include, by way of example, both general and special purpose microprocessors, and any one or more processors of any appropriate kind of digital computer. Generally, a processor will receive instructions and data from a read-only memory or a random-access memory or both. Elements of a computer can include a processor for performing instructions and one or more memory devices for storing instructions and data. Generally, a computer will also include, or be operatively coupled to receive data, transfer data or both, to/from one or more mass storage devices for storing data e.g., magnetic disks, magneto optical disks, optical disks, or solid-state disks. However, a computer need not have such devices. Moreover, a computer may be embedded in another device, e.g., a mobile telephone, a personal digital assistant (PDA), a mobile audio player, a Global Positioning System (GPS) receiver, etc. Computer-readable media suitable for storing computer program instructions and data include all forms of non-volatile memory, media and memory devices, including, by way of example, semiconductor memory devices (e.g., Erasable Programmable Read-Only Memory (EPROM), Electronically Erasable Programmable Read-Only Memory (EEPROM), and flash memory devices), magnetic disks (e.g., internal hard disks or removable disks), magneto optical disks (e. g. Compact Disc Read-Only Memory (CD ROM) disks, Digital Versatile Disk-Read-Only Memory (DVD-ROM) disks) and solid-state disks. The processor and the memory may be supplemented by, or incorporated in, special purpose logic circuitry.

To provide for interaction with a user, implementations may be realized on a computer having a display device, e.g., a Cathode Ray Tube (CRT) or Liquid Crystal Display (LCD) monitor, for displaying information to the user, and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back-end component, e.g., a data server, or that includes a middleware component, e.g., an application server, or that includes a front-end component, e.g., a client computer having a graphical user interface or a Web browser through which a user may interact with an implementation, or any appropriate combination of one or more such back-end, middleware, or front-end components. The components of the system may be interconnected by any appropriate form or medium of digital data communication, e.g., a communication network. Examples of communication networks include a Local Area Network (LAN) and a Wide Area Network (WAN), e.g., Intranet and Internet.

The computing system may include clients and servers. A client and server are generally remote from each other and typically interact through a communication network. The relationship of the client and server arises by virtue of computer programs running on the respective computers and having a client-server relationship to each other.

Embodiments of the present invention may comprise or utilize a special purpose or general-purpose computer including computer hardware. Embodiments within the scope of the present invention may also include physical and other computer-readable media for carrying or storing computer-executable instructions and/or data structures. Such computer-readable media can be any media that can be accessed by a general purpose or special purpose computer system. Computer-readable media that store computer-executable instructions are physical storage media. Computer-readable media that carry computer-executable instructions are transmission media. Thus, by way of example and not limitation, embodiments of the invention can comprise at least two distinctly different kinds of computer-readable media: physical computer-readable storage media and transmission computer-readable media.

Although the present embodiments have been described with reference to specific example embodiments, it will be evident that various modifications and changes may be made to these embodiments without departing from the broader spirit and scope of the various embodiments. For example, the various devices, units, and modules described herein may be enabled and operated using hardware circuitry (e.g., Complementary Metal Oxide Semiconductor (CMOS) based logic circuitry), firmware, software (e.g., embodied in a non-transitory machine-readable medium), or any combination of hardware, firmware, and software. For example, the various electrical structures and methods may be embodied using transistors, logic gates, and electrical circuits (e.g., Application Specific Integrated Circuit (ASIC) and/or Digital Signal Processor (DSP) circuit).

In addition, it will be appreciated that the various operations, processes, and methods disclosed herein may be embodied in a non-transitory machine-readable medium and/or a system. Accordingly, the specification and drawings are to be regarded in an illustrative rather than a restrictive sense.

Physical computer-readable storage media includes RAM, ROM, EEPROM, CD-ROM or other optical disk storage (such as CDs, DVDs, etc.), magnetic disk storage or other magnetic storage devices, solid-state disks or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures, and which can be accessed by a general purpose or special purpose computer. Combinations of the above, that enable the transport of electronic data between computer systems and/or modules and/or other electronic devices, are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (NIC), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binary, intermediate format instructions such as assembly language, or even source code. Although the subject matter has been described in language specific to structural features and/or methodological acts, it is to be understood that the subject matter defined in the claims is not necessarily limited to the described features or acts described. Rather, the described features and acts are disclosed as example forms of implementing the claims.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order to achieve desired results, this should not be understood as requiring that such operations be performed in the particular order shown or in sequential order or that all illustrated operations be performed, to achieve desirable results. In certain circumstances, multitasking and parallel processing may be advantageous. Moreover, the separation of various system components in the implementations should not be understood as requiring such separation in all implementations, and it should be understood that the described program components and systems may generally be integrated together in a single software product or packaged into multiple software products.

Even though particular combinations of features are recited in the claims and/or disclosed in the specification, these combinations are not intended to limit the disclosure of possible implementations. Other implementations are within the scope of the following claims. For example, the actions recited in the claims may be performed in a different order and still achieve desirable results. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

Further, the methods may be practiced by a computer system including one or more processors and computer-readable media such as computer memory. In particular, the computer memory may store computer-executable instructions that when executed by one or more processors cause various functions to be performed such as the acts recited in the embodiments.

The disclosure provides illustration and description but is not intended to be exhaustive or to limit the implementations to the precise form disclosed. Modifications and variations are possible in light of the above disclosure or may be acquired from practice of the implementations.

The following terms and phrases, unless otherwise indicated, shall be understood to have the following meanings.

As referred herein, an "autonomous vehicle" is a vehicle that is capable of sensing its environment and moving safely with little or no human input. An autonomous vehicle may operate in a mode selected from among an autonomous mode, a manual mode, and a remote-control mode. In an example, the autonomous mode indicates operation without control of a driver, the manual mode indicates operation in accordance with a control input of the driver, and the remote-control mode indicates remotely controlled operation by an external device.

As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

As used herein, "environment" refers to an environment of an autonomous vehicle. Few examples of the environment of the autonomous vehicle are the surrounding area, lane boundary, roadway, traffic, ambient conditions, obstacles, traffic signs and signals, speed limits, potholes, snow blocking, water logging etc.

As used herein, a "sensor" is a device that measures physical input from its environment and converts it into data that can be interpreted by either a human or a machine. Most sensors are electronic (the data is converted into electronic data), but some are simpler, such as a glass thermometer, which presents visual data.

As referred herein, "computing device" is a device system containing one or more computers, peripheral devices, and associated software. In an embodiment, the computing device can be embedded in the vehicle. In another embodiment, the computing device can operate via cloud.

As referred herein, "processor" refers to a device that interprets and executes instructions, comprising at least an instruction control unit and an arithmetic unit that contains a central processing unit.

As referred herein, "motion control module" refers to all technologies that influence the longitudinal, lateral, and vertical dynamics of a vehicle. The module comprises mechanical and mechatronic components such as steering, brakes, dampers, electronic control units, and software control unit. The software control unit determines and controls the optimal driving strategy and the optimal interaction of all actuators in the vehicle.

As referred herein, "occupancy grid map" is an effective way of representing environments. It divides surroundings into regular grids and stores processed sensor data in each grid. Behavioural decisions and path planning of the unmanned ground vehicle can be directly determined using the information in the grid map. Therefore, the accuracy and celerity of the grid map are essential requirements for automatic driving.

As used herein, "decision module" is used in choosing a goal position and a goal orientation for an autonomous vehicle.

As used herein, "density of a plurality of the obstacle" is the quantity of the plurality of the obstacles in an environment of the autonomous vehicle.

In various embodiments, the present disclosure provides methods and systems for planning a path for an autonomous vehicle from the vehicle's initial configuration to a goal configuration which is collision-free, kinematically-feasible, and near-minimal in path length based on real-time environment information.

In an aspect, the present disclosure provides a system for environment-aware path planning.

The system comprising: an autonomous vehicle comprising a plurality of sensors; a computing device comprising a processor; and a memory communicatively coupled to the processor, wherein the memory stores processor-executable instructions comprising a path planning module further comprising a dynamic step-size generator, which, on execution, causes the processor to: receive, at the computing device, sensor data from the plurality of sensors, pertaining to an environment of a current configuration; receive, at the computing device, a goal configuration; process, by the computing device, the sensor data, the current configuration, and the goal configuration to generate an occupancy grid map of the environment; update, at the computing device, within the occupancy grid map, the current configuration and the goal configuration based on the sensor data; generate, by the computing device, a path comprising a sequence of nodes of dynamic step-size; and wherein a successor node is generated at a current node, using the dynamic step-size generator; wherein a plurality of subpaths is generated at the current node to obtain a local path for the autonomous vehicle to reach to the successor node; wherein the local path is selected from a plurality of collision-free, kinematically-feasible candidate subpaths selected from the plurality of subpaths; and wherein length of the local path is least of the plurality of collision-free, kinematically-feasible candidate subpaths.

In one embodiment of the system, the autonomous vehicle is capable of sensing and navigating the environment. The autonomous vehicle is capable of sensing and navigating its environment with little or no input. For example, a human operator may enter an address into an autonomous vehicle and the vehicle may then be able to drive, without further input from the human (e.g., the human does not have to steer or touch the brake/gas pedals), to the specified destination.

In another embodiment of the system, the autonomous vehicle is in at least one of a driving mode, a reversing mode, and a parking mode.

Figure 1:
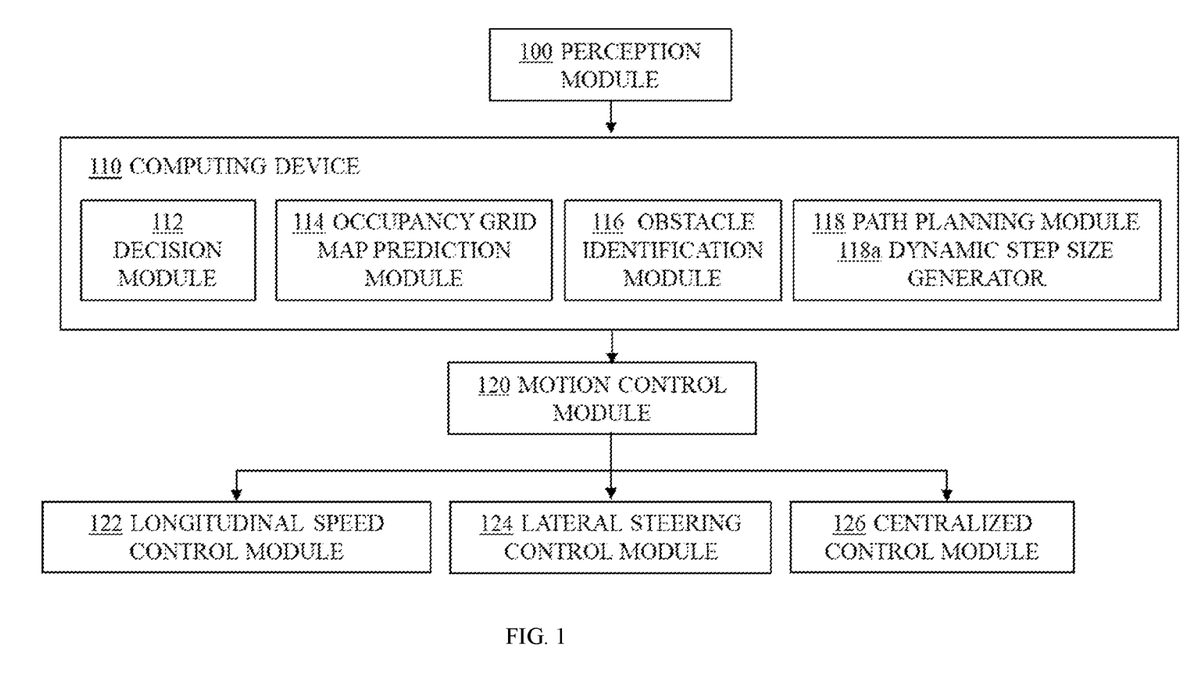
FIG. 1 depicts a block diagram of a system for an environment-aware path planning, in one or more embodiments.

Referring now specifically to FIG. 1, the system comprises an autonomous vehicle comprising a perception module 100, a computing device 110, and a motion control module 120.

In an embodiment of the system, the perception module 100 comprises a plurality of sensors.

In yet another embodiment of the method, the plurality of sensors comprises a camera, a location sensor, a radar sensor, a light detection and range sensor, an ultrasonic sensor, and an audio sensor.

In yet another embodiment of the system, the plurality of sensors is configured to operate in an autonomous mode.

In yet another embodiment of the system, the plurality of sensors is configured to sense an obstacle in the environment.

In yet another embodiment of the system, the computing device 110 comprises a decision module 112, an occupancy grid map prediction module 114, an obstacle identification module 116, and a path planning module 118.

In yet another embodiment of the system, the computing device comprises at least one of an industrial computing device and a cloud computing device.

In yet another embodiment of the system, the processor comprises a microprocessor.

In yet another embodiment of the system, the memory comprises at least one of a read only memory, a random-access memory and combination thereof.

In yet another embodiment of the system, the current configuration comprises a current position and current orientation information.

In yet another embodiment of the system, the goal configuration comprises a goal position and goal orientation information.

In yet another embodiment of the system, the goal position is received from at least one of a user interface, an external source, and an internal source.

In yet another embodiment of the system, the decision module 112 provides the goal configuration to the occupancy grid map prediction module 114.

In yet another embodiment of the system, the path planning module 118 may include a module, such as the occupancy grid map prediction module 114, for predicting and generating an occupancy grid map between a current configuration and a goal configuration. Alternatively, the occupancy grid map prediction module 114 for predicting and generating the occupancy grid map may be included in the processing system coupled to the path planning module 118.

In yet another embodiment of the system, the occupancy grid map is generated based on sensor data collected from different sensors on the autonomous vehicle.

In yet another embodiment of the system, the sensor data comprises vehicle data, track data and obstacle data.

For example, sensor data from the perception module 100 may be used to generate a current occupancy grid map from which the occupancy grid map prediction module 114 predicts and generates a set of occupancy grid maps Mt={Mt0, Mt1, . . . Mtn}. Estimated vehicle states may also be used to generate the current occupancy grid map.

The occupancy grid map prediction module 114 is configured to receive an occupancy grid map (e.g., a current occupancy grid map), and to predict and generate a set of occupancy grid maps Mt={Mt0, Mt1, . . . Mtn} based on the current occupancy grid map. Each predicted occupancy grid map in the set of occupancy grid maps {Mt0, Mt1, . . . Mtn} is an occupancy grid map associated with the vehicle predicted for a specific point in time t. For example, predicted occupancy grid map Mt0 represents an occupancy grid map generated for t=t0, where t0 is the present time. Occupancy grid map, Mt1 represents an occupancy grid map predicted for t=t1, where t1 represents a time interval after t0, and so on. The occupancy grid map prediction module 114 is configured to predict and generate a set of occupancy grid maps Mt based on a current occupancy grid map.

In yet another embodiment of the system, the occupancy grid map is generated in real-time.

In yet another embodiment of the system, the occupancy grid map is generated dynamically.

Obstacle identification module 116 is configured to detect obstacles around the autonomous vehicle. The plurality of sensors is configured in a rigorous multi-target tracking scheme to generate a consistent map of static and dynamic obstacles near the vehicle. A position, velocity, and attitude can also be determined using a position, velocity, and attitude estimator for the obstacles. Inertial and navigational sensors can be combined in a tightly coupled manner with the position, velocity, and attitude estimator and an improved type of Kalman Filtering technique to facilitate localization in an Earth-fixed coordinate frame.

In yet another embodiment of the system, the path planning module 118 comprises a path planning algorithm and a dynamic step-size generator 118a. The path planning algorithm can be selected from Dijkstra algorithm, Floyd-Warshall algorithm, A star algorithm, hierarchical algorithm, action behavior algorithm, Rapidly Exploring Random Tree (RRT) algorithm, machine learning algorithm, potential field domain method, grid method, fuzzy logic method, topological method, penalty function method, genetic algorithm, simulated annealing method, ant colony method, neural network method, and the like.

The purpose of the path planning module 118 is to determine a path for the autonomous vehicle to travel from an initial configuration to a goal configuration (e.g., a destination defined by the user). The initial configuration may be defined by the vehicle's current configuration, or an expected future position and orientation.

In yet another embodiment of the system, the path planning module comprises a hybrid A-star algorithm.

In yet another embodiment of the system, the path is to be traversed by the autonomous vehicle from the current configuration to the goal configuration.

In yet another embodiment of the system, the successor node is generated before tracking of the local path by the autonomous vehicle.

Path planning may also include determining plurality of subpaths from the current configuration.

In yet another embodiment of the system, a plurality of subpaths connects the current configuration to the goal configuration.

The plurality of subpaths is generated with consideration of conditions such as the drivable ground (e.g., defined roadway), obstacles (e.g., pedestrians and other vehicles), traffic regulations (e.g., obeying traffic signals) and user-defined preferences (e.g., avoidance of toll roads). In an embodiment of the system, the path planning module 118 may also incorporate digital geographical map information (e.g., from satellite maps or stored maps in an internal or external database), such as information about drivable areas (e.g., road condition, location of parking lots, presence of road tolls), as searchable parameters. The path planning module 118 may also receive information from an external system (e.g., via wireless communication) about real-time traffic conditions, for example, and incorporate this information into the searchable map. For example, the path planning module 118 may receive and share sensed data and/or planned path data with other vehicles. The movement direction and speed of moving obstacles may also be represented in the searchable map. In some examples, predicted motion or location of moving obstacles may also be represented in the searchable map. Generally, the searchable map may represent not just geographical information (as in conventional geographical maps) but also may represent additional parameters (e.g., angular speed, linear speed, linear acceleration and/or angular acceleration) to be considered in path planning.

In yet another embodiment of the system, the path planning module 118 determines a local path and plurality of subpaths based on the sensor data.

In yet another embodiment of the system, a successor node is generated at a current node, using the path planning module 118 comprising a dynamic step-size generator 118a.

In yet another embodiment of the system, plurality of subpaths is generated at the current node to obtain a local path for the autonomous vehicle to reach to the successor node.

In yet another embodiment of the system, the local path is selected from a plurality of collision-free, kinematically-feasible candidate subpaths selected from the plurality of subpaths.

In yet another embodiment of the system, length of the local path is least of the plurality of collision-free, kinematically-feasible candidate subpaths.

In yet another embodiment of the system, the system is further operable to: receive, at the computing device, data pertaining to real-time traffic, of a road map between the current configuration and the goal configuration from a data source; calculate, by the computing device, a first distance between the current configuration and the goal configuration; calculate, by the computing device, a second distance between the current configuration and the obstacle in the environment; estimate, by the computing device, a density of a plurality of the obstacle; and estimate, by the computing device, a searching step-size based on the density of the plurality of the obstacle, the first distance and the second distance.

In yet another embodiment of the system, the searching step-size is used to create the successor node in the occupancy grid map.

In yet another embodiment of the system, the sequence of nodes of dynamic step-size connects the current configuration to the goal configuration.

In yet another embodiment of the method, the system is further operable to: calculate, by the computing device, a maneuver for the autonomous vehicle by using a motion control module to track the local path; and control the autonomous vehicle based on the maneuver.

When generating the local path, the path planning module may be configured to generate different driving paths based on a maneuver mode of the vehicle. For example, the maneuver mode may be divided into a lane keeping mode and a lane change mode, in the driving mode.

In yet another embodiment of the system, the maneuver comprises an accelerating maneuver, a braking maneuver, a gear shifting maneuver, and a steering angle maneuver.

For example, when the maneuver mode of the vehicle is the lane keeping mode, the path planning module may be configured to generate a plurality of subpaths within a current driving lane of the vehicle and select any one of kinematically-feasible paths as a local path. Meanwhile, when the maneuver mode of the vehicle is the lane change mode, the path planning module may be configured to generate a plurality of subpaths with respect to a current driving lane of the vehicle and a target lane for lane change, respectively, and select a local path from a plurality of collision-free, kinematically-feasible candidate subpaths with least path length In yet another embodiment of the system, the motion control module comprises a longitudinal speed control module, a lateral steering control module and a centralized control module. Referring to the FIG. 1, the motion control module 120 comprises the longitudinal speed control module 122, the lateral steering control module 124 and the centralized control module 126.

In yet another embodiment of the system, the longitudinal speed control module is configured to control driving, braking, acceleration, and deceleration. Longitudinal control is based on vehicle and road information, by controlling the driving or braking of the intelligent vehicle, and accelerating or decelerating according to the planned speed, thereby achieving accurate and fast tracking of the planned longitudinal behavior.

In yet another embodiment of the system, the lateral steering control module controls a front wheel steering angle. The target of lateral control is to control the front wheel steering angle, so as to achieve accurate and fast tracking of planned path.

In yet another embodiment of the system, the centralized control module controls coupling of the longitudinal speed control module and the lateral steering control module.

In an aspect, a method is described herein. The method, comprises: receiving, at a computing device, sensor data from a plurality of sensors of an autonomous vehicle, pertaining to an environment of a current configuration; receiving, at the computing device, a goal configuration; processing, by the computing device, the sensor data, the current configuration, and the goal configuration to generate an occupancy grid map of the environment; updating, at the computing device, within the occupancy grid map, the current configuration and the goal configuration based on the sensor data; generating, by the computing device, a path comprising a sequence of nodes of dynamic step-size; and wherein a successor node is generated at a current node, using a path planning module comprising a dynamic step-size generator; wherein a plurality of subpaths is generated at the current node to obtain a local path for the autonomous vehicle to reach to the successor node; wherein the local path is selected from a plurality of collision-free, kinematically-feasible candidate subpaths selected from the plurality of subpaths; and wherein length of the local path is least of the plurality of collision-free, kinematically-feasible candidate subpaths.

In one embodiment of the method, the autonomous vehicle is capable of sensing and navigating the environment.

In another embodiment of the method, the autonomous vehicle is in at least one of a driving mode, a reversing mode, and a parking mode.

In yet another embodiment of the method, the plurality of sensors comprises a camera, a location sensor, a radar sensor, a light detection and range sensor, an ultrasonic sensor, and an audio sensor.

In yet another embodiment of the method, the plurality of sensors is configured to operate in an autonomous mode.

In yet another embodiment of the method, the plurality of sensors is configured to sense an obstacle in the environment.

Figure 2:
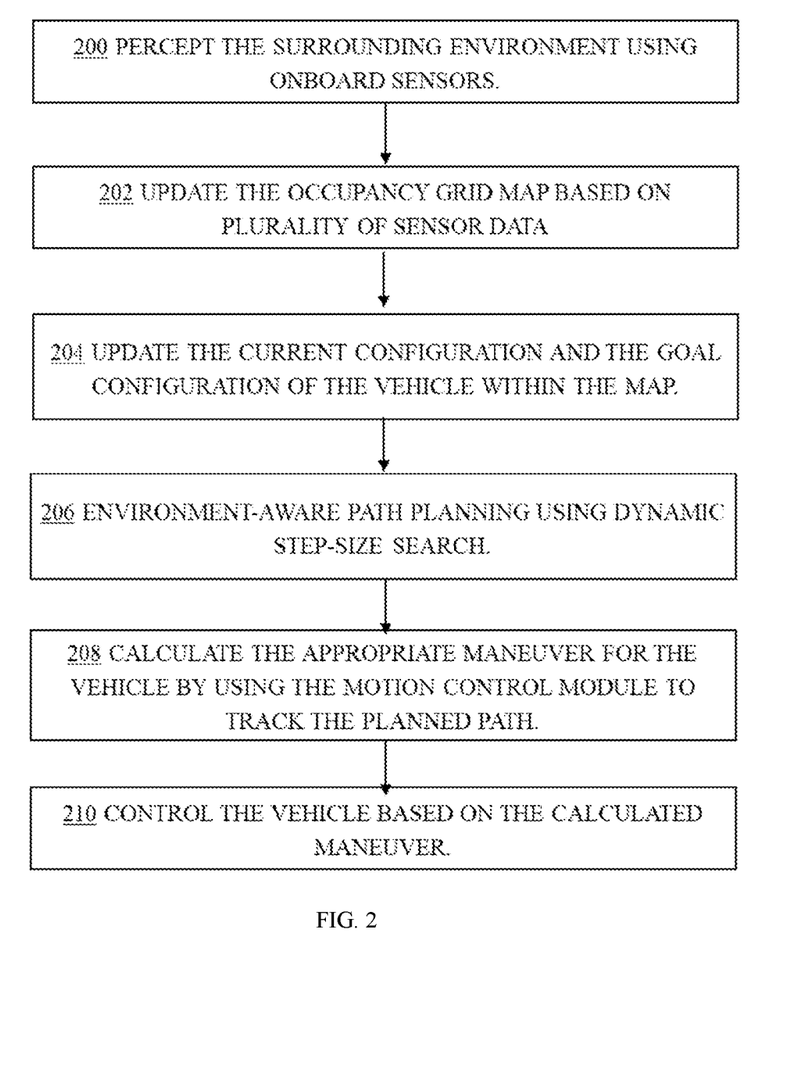
FIG. 2 provides a flowchart for an environment-aware path planning, in one or more embodiments.

FIG. 2 provides a flowchart for path planning, in one or more embodiments. An onboard computing device is configured to process the sensor data and provide a dynamic occupancy grid map of the surrounding environment in real-time. Based on the occupancy grid map, the path planning module can quickly calculate a collision-free and dynamically feasible path towards the goal configuration for the vehicle to follow. The steps followed for path planning are as below:

Step 200: Percept the surrounding environment using onboard sensors.

Step 202: Update the occupancy grid map based on sensor data.

Step 206: Update the current configuration and the goal configuration of the vehicle within the map.

Step 208: Environment-aware path planning using dynamic step-size search.

Step 210: Calculate the appropriate maneuver for the vehicle by using the motion control module to track the planned path.

Step 212: Calculate the appropriate maneuver for the vehicle by using the motion control module to track the planned path.

In yet another embodiment of the method, the searching step-size is greater in a wide-open area than the searching step-size in a crowded environment.

The searching step-size is dynamically decided based on the complexity of the environment, the density of the plurality of the obstacle, the first distance and the second distance.

In yet another embodiment of the method, the estimation of the density of the plurality of the obstacle, type of obstacles and the second distance between the current configuration can be done by the computing device using digital image processing techniques. Digital image processing techniques may comprise image filtering, segmentation, enhancement, and edge detection. The proposed method can enable much more efficient path planning in multiple driving scenarios.

Figure 3A:
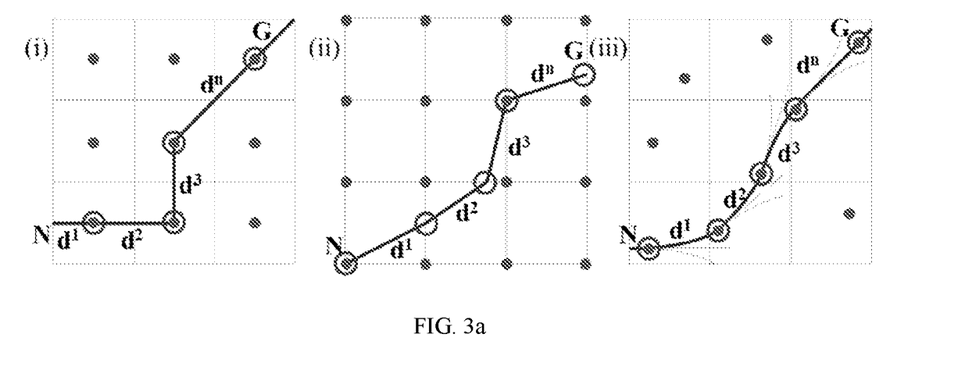
FIG. 3a-3b provides a graphical comparison of conventional searching algorithms with an environment-aware path planning algorithm, in one or more embodiments.
Figure 3B:
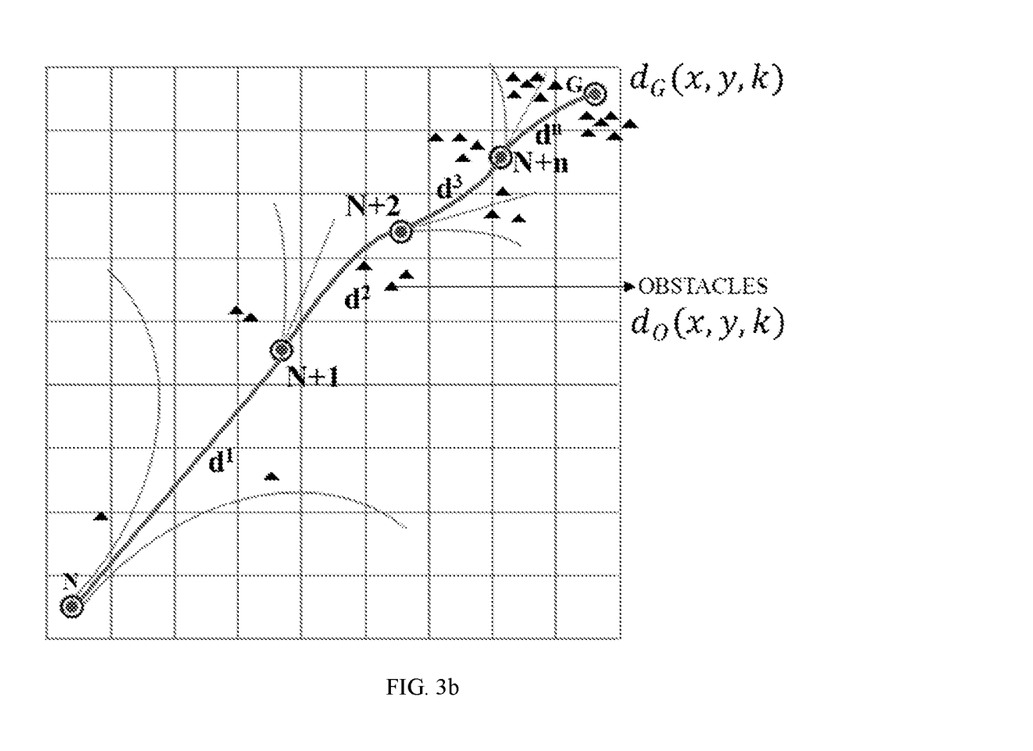

FIG. 3a-3b provides graphical comparison of conventional searching algorithms with the environment-aware path planning algorithm, in one or more embodiments. The path planning module determines a path for the autonomous vehicle.

In yet another embodiment of the method, the path planning module comprises a hybrid A-star algorithm.

The conventional A-star based algorithms (FIG. 3a (i)-(iii)) use static search step-size (d1=d2=d3=d4) to find the shortest collision-free path towards the goal configuration from the current configuration. These are the most widely used methods, but with low computationally efficiency and can take a long time to provide a planned path in complex environments and/or for long distance planning.

In yet another embodiment of the method, the path planning module comprises a dynamic step-size generator 118a. In an example, the hybrid A-star algorithm comprising the dynamic step-size generator dynamically changes the searching step-size during the path planning process based on the real-time environment information (FIG. 3b). The plurality of nodes (N, N+1, . . . , N+n) of dynamic step-size is generated (d1≠d2≠d3≠dn) from the current configuration to the goal configuration based on the density of the plurality of the obstacle in the environment.

In yet another embodiment of the method, the sensor data comprises vehicle data, track data and obstacle data.

In yet another embodiment of the method, the current configuration comprises a current position and current orientation information.

In yet another embodiment of the method, the goal configuration comprises a goal position and goal orientation information.

In yet another embodiment of the method, the goal position is received from at least one of a user interface, an external source, and an internal source.

In yet another embodiment of the method, the occupancy grid map is generated in real-time.

In yet another embodiment of the method, the occupancy grid map is generated dynamically.

In yet another embodiment of the method, the path is to be traversed by the autonomous vehicle from the current configuration to the goal configuration.

In yet another embodiment of the method, the successor node is generated before tracking of the local path by the autonomous vehicle.

In yet another embodiment of the method, the plurality of subpaths connects the current configuration to the goal configuration.

In yet another embodiment of the method, the method further comprises: receiving, at the computing device, data pertaining to real-time traffic, of a road map between the current configuration and the goal configuration from a data source; calculating, by the computing device, a first distance between the current configuration and the goal configuration; calculating, by the computing device, a second distance between the current configuration and the obstacle in the environment; estimating, by the computing device, a density of a plurality of the obstacle; and estimating, by the computing device, a searching step-size based on the density of the plurality of the obstacle, the first distance and the second distance.

In yet another embodiment of the method, the searching step-size is used to create the successor node in the occupancy grid map.

In yet another embodiment of the method, the searching step-size is greater in a wide-open area than the searching step-size in a crowded environment.

In yet another embodiment of the method, the sequence of nodes of dynamic step-size connects the current configuration to the goal configuration.

In yet another embodiment of the method, the method further comprises: calculating, by the computing device, a maneuver for the autonomous vehicle by using a motion control module to track the local path; and controlling the autonomous vehicle based on the maneuver.

In yet another embodiment of the method, the maneuver comprises an accelerating maneuver, a braking maneuver, a gear shifting maneuver, and a steering angle maneuver.

In yet another embodiment of the method, the motion control module comprises a longitudinal speed control module, a lateral steering control module and a centralized control module.

In yet another embodiment of the method, the longitudinal speed control module is configured to control driving, braking, acceleration, and deceleration.

In yet another embodiment of the method, the lateral steering control module controls a front wheel steering angle.

In yet another embodiment of the method, the centralized control module controls coupling of the longitudinal speed control module and the lateral steering control module.

Figure 4:
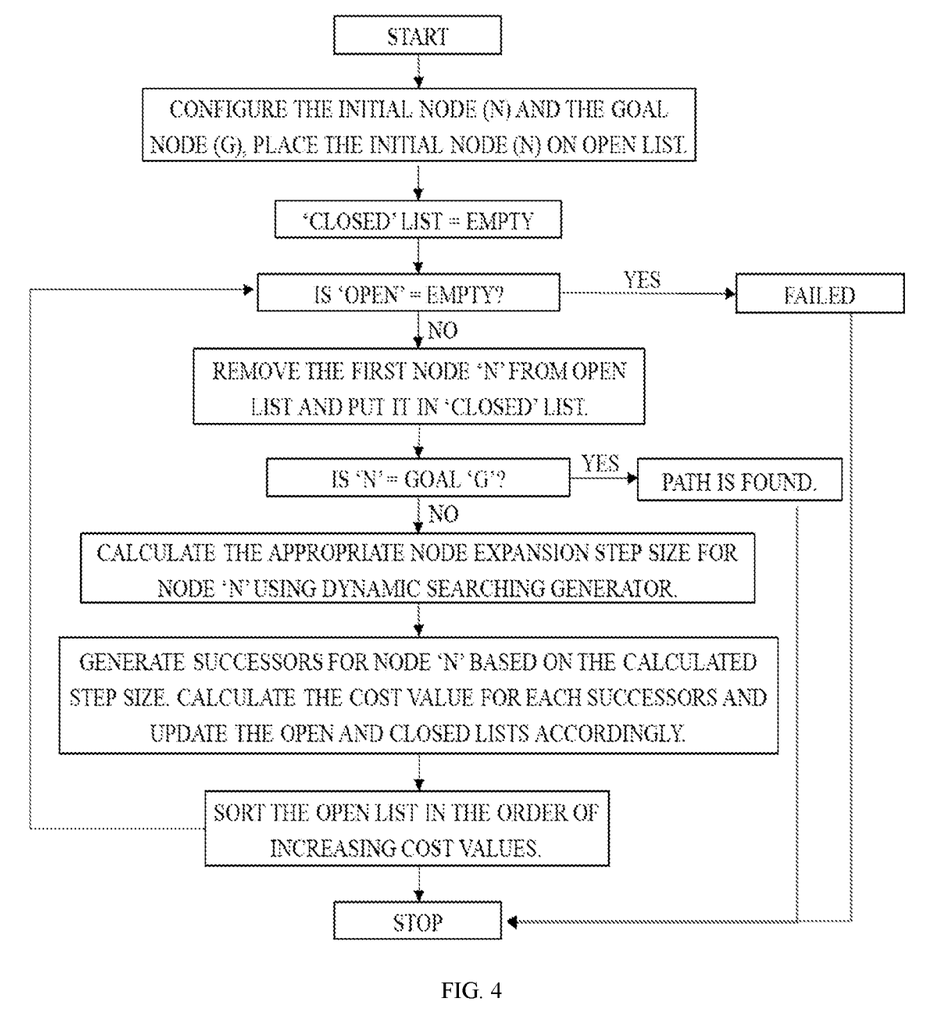
FIG. 4 depicts a flowchart of a dynamic step-size generation, in one or more embodiments.

FIG. 4 depicts a flowchart of dynamic step-size generation, in one or more embodiments.

In yet another embodiment of the method, an initial node (N) and a goal node (G) are configured, and the initial node (N) is assigned on an open list. A closed list is assigned as EMPTY. The appropriate node step-size for node N is generated using the dynamic step-size generator. The successor node Nn+1 is generated based on the calculated step-size. The cost value for the successor node Nn+1 is calculated. Accordingly, the open list and the closed list are updated and the Nn+1 is set to N. The open list is sorted based on the increasing cost values. The whole process is repeated iteratively till N is equal to G or the open list is equal to EMPTY.

In yet another embodiment of the method, the cost value can be a function of time, distance or other defined criteria and may comprise a travel cost, an environmental cost, and a directional cost.

During the planning process, at each searching cycle k, the dynamic step-size generator decides the step-size for creating successor nodes based on the complexity of the environment, the first distance between the current configuration and the goal configuration ($d_G(x, y, k)$), and the second distance between the current configuration and the obstacle in the environment ($d_0(x, y, k)$). Depending on the complexity of the environment, a reference step-size $L_{ref}$ is defined as a baseline. To avoid the overhead of the step-size generator at each step, the generator is modeled as a zero-order system that can be executed extremely fast (i.e., O (1) complexity) with negligible resource consumption. The appropriate step-size can be calculated by: $L_k = L_{ref} + k_1 d_G(x, y, k) + k_2 d_0(x, y, k)$, where $k_1$ and $k_2$ are tuning parameters.

In yet another embodiment of the method, the tuning parameters can be static.

In yet another embodiment of the method, the tuning parameter can be dynamic.

In yet another embodiment of the method, the tuning parameter can be obtained manually.

In yet another embodiment of the method, the tuning parameter can be obtained by one of a statistical analysis, a rule-based analysis, or a machine learning algorithm.

Figure 5:
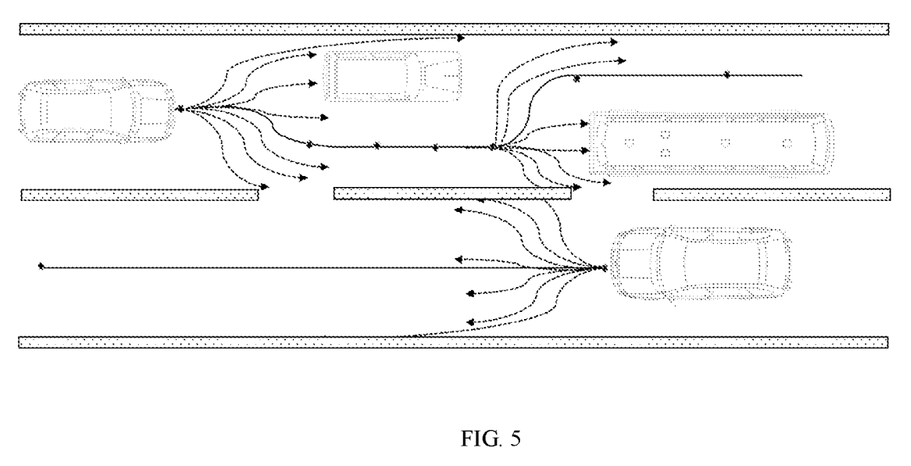
FIG. 5 depicts generation of a plurality of subpaths at a current node to obtain the local path, in one or more embodiments.

FIG. 5 depicts generation of a plurality of subpaths at a current node to obtain the local path, in one or more embodiments.

In an embodiment of the method, a plurality of subpaths is generated at a current node to obtain the local path for the autonomous vehicle to reach to the successor node. In another embodiment of the method, a successor node is generated at the current node, using the dynamic step-size generator. In yet another embodiment of the method, the local path is selected from a plurality of collision-free, kinematically-feasible candidate subpaths selected from the plurality of subpaths wherein length of the local path is least of the plurality of collision-free, kinematically-feasible candidate subpaths.

Figure 6:
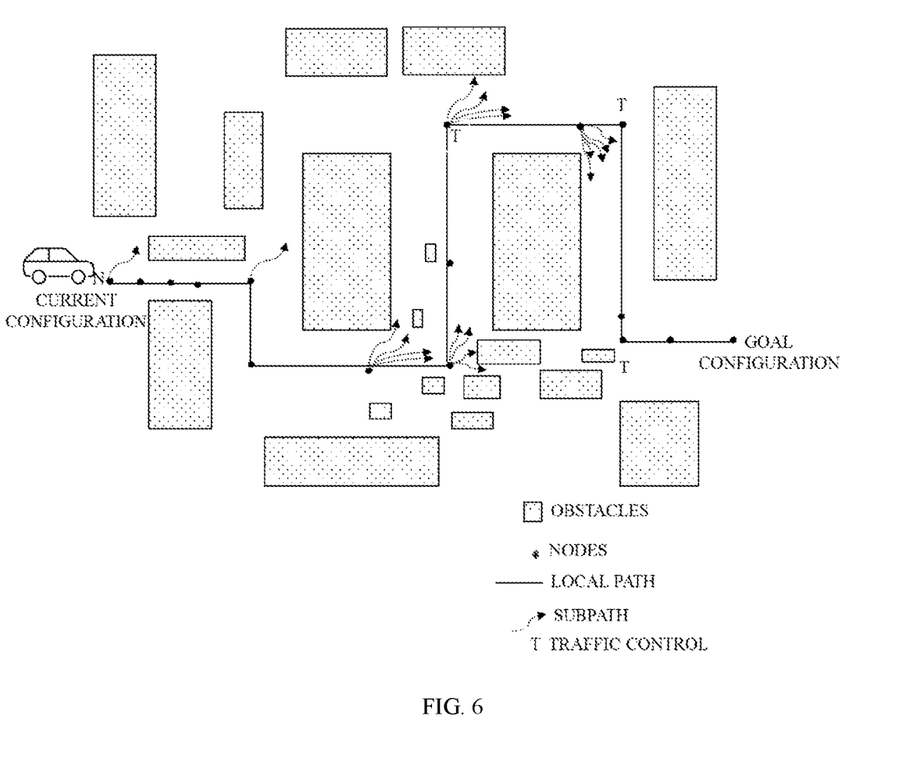
FIG. 6 depicts an implementation of environment-aware path planning, in one or more embodiments.

FIG. 6 depicts an example implementation of environment-aware path planning, in one or more embodiments.

In yet another aspect a non-transitory computer readable medium is described herein. The non-transitory computer readable medium including instructions stored thereon that when processed by at least one processor causes a system associated with an autonomous vehicle to perform operations comprising: receiving, at a computing device, sensor data from a plurality of sensors, pertaining to an environment of a current configuration; receiving, at the computing device, a goal configuration; processing, by the computing device, the sensor data, the current configuration, and the goal configuration to generate an occupancy grid map of the environment; updating, at the computing device, within the occupancy grid map, the current configuration and the goal configuration based on the sensor data; generating, by the computing device, a path comprising a sequence of nodes of dynamic step-size; calculating, by the computing device, a maneuver for the autonomous vehicle by using a motion control module to track a local path; controlling the autonomous vehicle based on the maneuver; and wherein a successor node is generated at a current node, using a dynamic step-size generator; wherein a plurality of subpaths is generated at the current node to obtain the local path for the autonomous vehicle to reach to the successor node; wherein the local path is selected from a plurality of collision-free, kinematically-feasible candidate subpaths selected from the plurality of subpaths; and wherein length of the local path is least of the plurality of collision-free, kinematically-feasible candidate subpaths.

What is claimed is:

1. A system comprising:
an autonomous vehicle comprising a plurality of sensors;
a computing device comprising a processor; and
a memory communicatively coupled to the processor, wherein the memory stores processor-executable instructions comprising a path planning module further comprising a dynamic step-size generator, which, on execution, causes the processor to:
receive, at the computing device, sensor data from the plurality of sensors, pertaining to an environment at a first current node of a current configuration;
receive, at the computing device, a goal configuration;
process, by the computing device, the sensor data, the current configuration, and the goal configuration to generate an occupancy grid map of the environment;
update, at the computing device, within the occupancy grid map, the current configuration and the goal configuration based on the sensor data; and
generate, by the computing device using the path planning module, a path from the first current node to reach to the goal configuration;
generate, a first local path from the first current node to a first successor node using the dynamic step-size generator, wherein the first local path is selected from a plurality of collision-free, kinematically-feasible candidate sub paths selected from a plurality of sub paths; and wherein a length of the first local path is least of the candidate sub paths;
calculate, by the computing device, a maneuver for the autonomous vehicle by using a motion control module to traverse the first local path, wherein the maneuver comprises an accelerating maneuver, a braking maneuver, a gear shifting maneuver, and a steering angle maneuver;
control the autonomous vehicle along the first local path to reach to the first successor node and designate the first successor node as a second current node;
continue to generate a second successor node, using the dynamic step-size generator to obtain a second local path, and maneuver the vehicle along the second local path until the autonomous vehicle reaches the goal configuration; and
wherein the first current node and the first successor node generated by the dynamic step-size generator are of a first step-size; and the second current node and the second successor node generated by the dynamic step-size generator are of a second step-size; and wherein the first step-size and the second step-size are different.

2. The system of claim 1, wherein the plurality of sensors is configured to operate in an autonomous mode to sense an obstacle in the environment.

3. The system of claim 2, wherein the system is further operable to:
receive, at the computing device, data pertaining to real-time traffic, of a road map between the current configuration and the goal configuration from a data source; calculate, by the computing device, a first distance between the current configuration to the goal configuration;
calculate, by the computing device, a second distance between the current configuration and the obstacle in the environment;
estimate, by the computing device, a density of a plurality of the obstacle;
estimate, by the computing device, a searching step-size based on the density of the plurality of the obstacle, the first distance and the second distance; and
wherein the searching step-size is used to create the first successor node and the second successor node in the occupancy grid map; and
wherein the searching step-size is greater in a wide-open area than the searching step-size in a crowded environment.

4. The system of claim 1, wherein the autonomous vehicle is in at least one of a driving mode, a reversing mode, and a parking mode.

5. The system of claim 1, wherein the sensor data comprises vehicle data, track data and obstacle data.

6. The system of claim 1, wherein the current configuration comprises a current position and current orientation information and the goal configuration comprises a goal position and goal orientation information.

7. The system of claim 6, wherein the goal position is received from one of a user interface, an external source, and an internal source.

8. The system of claim 1, wherein the plurality of sensors comprises a camera, radar sensor, a light detection and range sensor, an ultrasonic sensor, and an audio sensor.

9. A method comprising:
receiving, at a computing device, sensor data from a plurality of sensors of an autonomous vehicle, pertaining to an environment at a first current node of a current configuration;
receiving, at the computing device, a goal configuration;
processing, by the computing device, the sensor data, the current configuration, and the goal configuration to generate an occupancy grid map of the environment;

updating, at the computing device, within the occupancy grid map, the current configuration and the goal configuration based on the sensor data; and generating, by the computing device using a path planning module, a path from the first current node to reach to the goal configuration;

generating, a first local path from the first current node to a first successor node using a dynamic step-size generator, wherein the first local path is selected from a plurality of collision-free, kinematically-feasible candidate sub paths selected from a plurality of sub paths; and wherein a length of the first local path is least of the candidate sub paths;

calculating, by the computing device, a maneuver for the autonomous vehicle by using a motion control module to traverse the first local path, wherein the maneuver comprises an accelerating maneuver, a braking maneuver, a gear shifting maneuver, and a steering angle maneuver;

controlling the autonomous vehicle along the first local path to reach to the first successor node and designate the first successor node as a second current node;

continuing to generate a second successor node, using the dynamic step-size generator to obtain a second local path, and maneuver the vehicle along the second local path until the autonomous vehicle reaches the goal configuration; and wherein the first current node and the first successor node generated by the dynamic step-size generator are of a first step-size; and the second current node and the second successor node generated by the dynamic step-size generator are of a second step-size; and wherein the first step-size and the second step-size are different.

10. The method of claim 9, wherein the path planning module comprises a hybrid A-star algorithm.

11. The method of claim 9, wherein the current configuration comprises a current position and current orientation information and the goal configuration comprises a goal position and goal orientation information.

12. The method of claim 9, wherein the occupancy grid map is generated dynamically in real-time.

13. The method of claim 9, wherein the first successor node and the second successor node are generated before tracking of the first local path and the second local path by the autonomous vehicle.

14. The method of claim 9, wherein the plurality of sub-paths and the first current node, the second current node, the first successor node, and the second successor node connect the current configuration to the goal configuration.

15. The method of claim 9, further comprises:

receiving, at the computing device, data pertaining to real-time traffic, of a road map between the current configuration and the goal configuration from a data source; calculating, by the computing device, a first distance between the current configuration to the goal configuration;

calculating, by the computing device, a second distance between the current configuration and an obstacle, in the environment;

estimating, by the computing device, a density of a plurality of the obstacle; and estimate, by the computing device, a searching step-size based on the density of the plurality of the obstacle, the first distance and the second distance.

16. The method of claim 15, wherein the searching step-size is greater in a wide-open area than the searching step-size in a crowded environment.

17. A non-transitory computer readable medium including instructions stored thereon that when processed by at least one processor causes a system associated with an autonomous vehicle to perform operations comprising:

receiving, at a computing device, sensor data from a plurality of sensors, pertaining to an environment at a first current node of a current configuration;

receiving, at the computing device, a goal configuration;

processing, by the computing device, the sensor data, the current configuration, and the goal configuration to generate an occupancy grid map of the environment;

updating, at the computing device, within the occupancy grid map, the current configuration and the goal configuration based on the sensor data;

generating, by the computing device using a path planning module, a path from the first current node to reach to the goal configuration;

generating, a first local path from the first current node to a first successor node using a dynamic step-size generator, wherein the first local path is selected from a plurality of collision-free, kinematically-feasible candidate sub paths selected from a plurality of sub paths; and wherein a length of the first local path is least of the candidate sub paths;

calculating, by the computing device, a maneuver for the autonomous vehicle by using a motion control module to traverse the first local path, wherein the maneuver comprises an accelerating maneuver, a braking maneuver, a gear shifting maneuver, and a steering angle maneuver; and controlling, the autonomous vehicle along the first local path to reach to the first successor node and designate the first successor node as a second current node; and continuing to generate a second successor node, using the dynamic step-size generator to obtain a second local path, and maneuver the vehicle along the second local path until the autonomous vehicle reaches the goal configuration; and wherein the first current node and the first successor node generated by the dynamic step-size generator are of a first step-size; and the second current node and the second successor node generated by the dynamic step-size generator are of a second step-size; and wherein the first step-size and the second step-size are different.

* * * * *